(12) United States Patent
Winslow

(10) Patent No.: US 7,152,538 B1
(45) Date of Patent: Dec. 26, 2006

(54) SPRIG PLANTING MACHINE

(76) Inventor: N. Ernest Winslow, 1006 Stamper Siding Rd., Scotland Neck, NC (US) 27874-8791

( * ) Notice: Subject to any disclaimer, the term of this patent is extended or adjusted under 35 U.S.C. 154(b) by 342 days.

(21) Appl. No.: 10/247,322

(22) Filed: Sep. 19, 2002

(51) Int. Cl.
*A01C 11/00* (2006.01)

(52) U.S. Cl. .................. 111/104; 111/907

(58) Field of Classification Search .......... 111/130, 111/109, 8, 9, 149, 900, 901, 907, 104, 105; 404/110, 108, 101; 171/16; 37/107; 198/603, 198/318, 861.5
See application file for complete search history.

(56) References Cited

U.S. PATENT DOCUMENTS

| | | | | |
|---|---|---|---|---|
| 3,468,441 A * | 9/1969 | Longman | .................. | 111/104 |
| 3,589,319 A * | 6/1971 | Peters | .................. | 111/115 |
| 3,702,664 A * | 11/1972 | Clement | .................. | 111/104 |
| 3,939,785 A | 2/1976 | Duffy | | |
| 3,963,138 A * | 6/1976 | Fowler | .................. | 414/502 |
| 4,005,805 A * | 2/1977 | Faxas | .................. | 222/626 |
| 4,011,023 A * | 3/1977 | Cutler | .................. | 404/77 |
| 4,047,631 A * | 9/1977 | Diz | .................. | 414/502 |
| 4,084,465 A * | 4/1978 | Dugas | .................. | 83/103 |
| 4,106,669 A * | 8/1978 | Longman | .................. | 221/217 |
| 4,266,490 A * | 5/1981 | Haines et al. | .................. | 111/104 |
| 4,314,514 A * | 2/1982 | Binder | .................. | 111/104 |
| 4,450,778 A * | 5/1984 | Quick | .................. | 111/104 |
| 4,530,293 A * | 7/1985 | Stiff et al. | .................. | 111/104 |
| 4,653,411 A * | 3/1987 | Davis, Sr. | .................. | 111/104 |
| 4,899,869 A * | 2/1990 | Johnson | .................. | 198/603 |
| 5,351,634 A | 10/1994 | Patton | | |
| 5,357,882 A * | 10/1994 | Lemmons | .................. | 111/111 |
| 5,417,293 A | 5/1995 | Leader | | |
| 5,469,797 A * | 11/1995 | Hearne, Jr. | .................. | 111/200 |
| 5,480,256 A * | 1/1996 | Itsekson et al. | .................. | 404/72 |
| 5,528,890 A | 6/1996 | Gray et al. | | |
| 6,223,662 B1 | 5/2001 | Lastinger et al. | | |

OTHER PUBLICATIONS

Advertisement entitled "Spriggers Choice, Inc." from the Southern Farm & Livestock Directory, Jun. 2002, (1 page).

* cited by examiner

*Primary Examiner*—Victor Batson
(74) *Attorney, Agent, or Firm*—Coats & Bennett, P.L.L.C.

(57) ABSTRACT

A sprig planting machine is provided and includes a hopper for holding sprigs. A first conveyor is disposed below the hopper and receives sprigs from the hopper. Sprigs on the first conveyor are conveyed to a discharge point where the sprigs are discharged and fall downwardly onto a second conveyor. The second conveyor conveys the sprigs in a direction generally opposite to the direction of movement of the sprigs on the first conveyor. Prior to being discharged from the second conveyor, at least some of the sprigs are engaged by a counter rotating agitator that agitates and fluffs the sprigs. Eventually sprigs pass underneath the counter rotating agitator and are discharged from a discharge end of the second conveyor onto the underlying ground. As the machine moves over the ground, the sprigs can be planted in a broadcasted manner or the sprigs can be planted in rows. In one embodiment of the present invention, a single sprig planting machine includes two planting options, a broadcast planting option and a row planting option.

28 Claims, 7 Drawing Sheets

SPRIG PLANTING MACHINE

FIELD OF INVENTION

The present invention relates to sprig planting machines.

BACKGROUND OF THE INVENTION

Sprig planting machines are known. For example, see the disclosures in U.S. Pat. No. 6,223,662; U.S. Pat. No. 5,351,634; and U.S. Pat. No. 3,939,785. Additionally, Spriggers Choice, Inc. of Parrott, Ga., has for some years manufactured and sold a no-till sprig machine. Basically, all of these sprig planting machines are similar in a number of respects. First, they include a receiving unit for receiving and holding sprig material to be planted. In some designs the receiving unit is simply a hopper that receives and holds sprig material. In other designs, the sprig planting machine is designed to receive and hold sprig material in a harvested role configuration. In either case, the sprig planting machine carries the supply of sprig material and by utilizing a single conveyor, sprig material is transferred from the hopper or the holding area to a point where the sprig material is discharged on the ground. Sprigs can be broadcast or planted in rows. For the most part, sprig planting machines are particularly designed as broadcast planting machines or as row planting machines. Therefore, in the past, in order to have the capability of both broadcast planting and row crop planting, an operator used two separate machines.

One of the major problems encountered in sprig planting machines is the inability of conventional sprig planting machines to consistently plant a uniform quantity of sprigs. Where the planting is not uniform, it follows that the resulting grass crop will be spotted and less than uniform. There are a number of reasons why it is difficult for sprig planting machines to plant a uniform crop of sprigs. First, sprigs naturally tend to exist in interwoven balls or bundles. Much of this might be attributed to how sprigs are grown and the harvesting methods employed. In any case, the interwoven sprigs tend to be interlocked and difficult to separate. Secondly, as noted above, in cases where the sprig planting machine utilizes a hopper, one often finds that the sprig material about the bottom or lower portion of the hopper is compressed and compact due to the weight of the overlying sprig material. When portions of the sprig material to be planted are compressed and compact, it is much more difficult for the sprig planting machine to fluff and separate the sprig material. Consequently, balls or clumps of compressed and bundled sprigs tend to move through the sprig planting machine untreated, and, as a result, these bundles or balls of sprigs are discharged onto the ground and the result is an ununiform planting.

Finally, sprig planting machines simply have not been designed with the capability of dealing with the inherent nature of sprig material. That is, sprig planting machines of the past have not focused on engaging and separating the sprig material between the receiving or holding area of the supply of sprig material and the ultimate point where the sprig material is discharged by the planting machine. In fact, for the most part, sprig planting machines include one conveyor for conveying the sprig material from a hopper or other holding area to the point of discharge. Often a portion of the single conveyor lies underneath the supply of sprig material to be planted. Consequently, there is little room and little opportunity to engage the sprig material and separate and fluff the material such that the sprig material can be more closely monitored and controlled to achieve a uniform planting or distribution.

Therefore, there is and continues to be a need for a sprig planting machine that is designed to engage and treat the material between the hopper or holding area and the point of discharge such that in the end a uniform quantity of sprig material is continuously discharged from the sprig planting machine as it traverses the ground.

SUMMARY OF THE INVENTION

The present invention entails a sprig planting machine having a holding area for holding a supply of sprig material to be planted and at least two conveyors for conveying the sprig material from the holding area to a discharge point. In the case of one embodiment, there is provided a first conveyor that receives sprig material and conveys the sprig material to a discharge point where the sprig material is discharged onto a second conveyor. The second conveyor, in this embodiment, runs counter to the direction of the first conveyor. Further, in this design, there is provided a rotary agitator disposed adjacent and above the second conveyor for engaging the oncoming sprig material and agitating and fluffing the same. Sprig material is allowed to pass underneath the rotary agitator and is discharged from one end of the second conveyor.

In one particular embodiment of the present invention, the rotary agitator is designed to rotate counter to the direction of the upper run of the second conveyor. That is, the second conveyor acts to convey the sprig material into the counter rotating agitator, and the agitator tends to inhibit the movement of some of the sprig material and causes the sprig material to separate, fluff and accumulate between the rotary agitator and a retainer disposed adjacent the end of the second conveyor opposite the discharge end.

Finally, the sprig planting machine of the present invention provides for two planting options. That is, the single sprig planting machine of the present invention can assume one of two planting modes. First, the sprig planting machine of the present invention is designed to broadcast the sprigs. If the operator elects not to broadcast the sprigs, then the operator can elect to alter the sprig planting machine and install a row planting option on the same machine.

Other objects and advantages of the present invention will become apparent and obvious from a study of the following description and the accompanying drawings, which are merely illustrative of such.

DESCRIPTION OF AN EXEMPLARY EMBODIMENT

Figure 1:
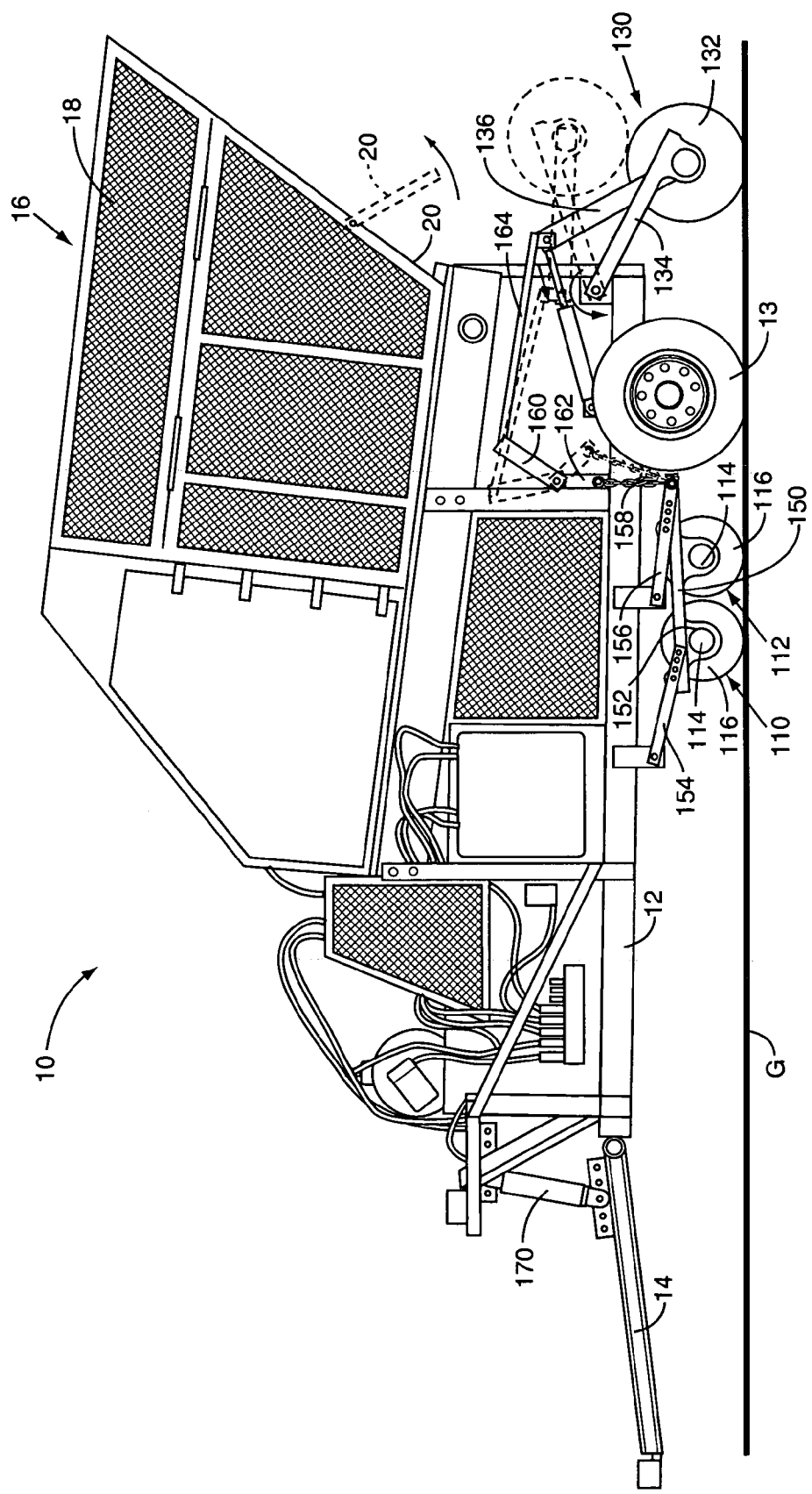
FIG. 1 is a side elevational view of the sprig planting machine of the present invention.

With further reference to the drawings, the sprig planting machine of the present invention is shown therein and indicated generally by the numeral 10. The sprig planting machine disclosed herein is a pull type machine that is adapted to be connected to a tractor and pulled over the ground G. However, it should be appreciated that the present invention could be incorporated into a self-propelled sprig planting machine. In any event, with reference to FIG. 1, sprig planting machine 10 includes a frame structure 12 that is supported by a plurality of wheels 13. Extending forwardly from the frame structure 12 is a tongue 14 that is designed to be secured to the draw bar of a tractor.

Mounted on the sprig planting machine is a sprig holding area for receiving and holding a supply of sprig material to be planted. The sprig holding area can assume numerous designs. In the case of the present embodiment, the sprig holding area comprises a hopper indicated generally by the numeral 16. Hopper 16 includes an open bottom, an open top and a surrounding wall structure 18. While the construction of the wall structure 18 may vary, in the design illustrated herein, some of the wall structure is made of expanded metal. An openable tailgate 20 extends across the lower rear portion of the hopper 16. As will be described subsequently herein, by opening the tail gate 20 and reversing a conveyor disposed underneath the hopper 16, sprig material contained within the hopper 16 can be easily unloaded if desired.

Figure 2:
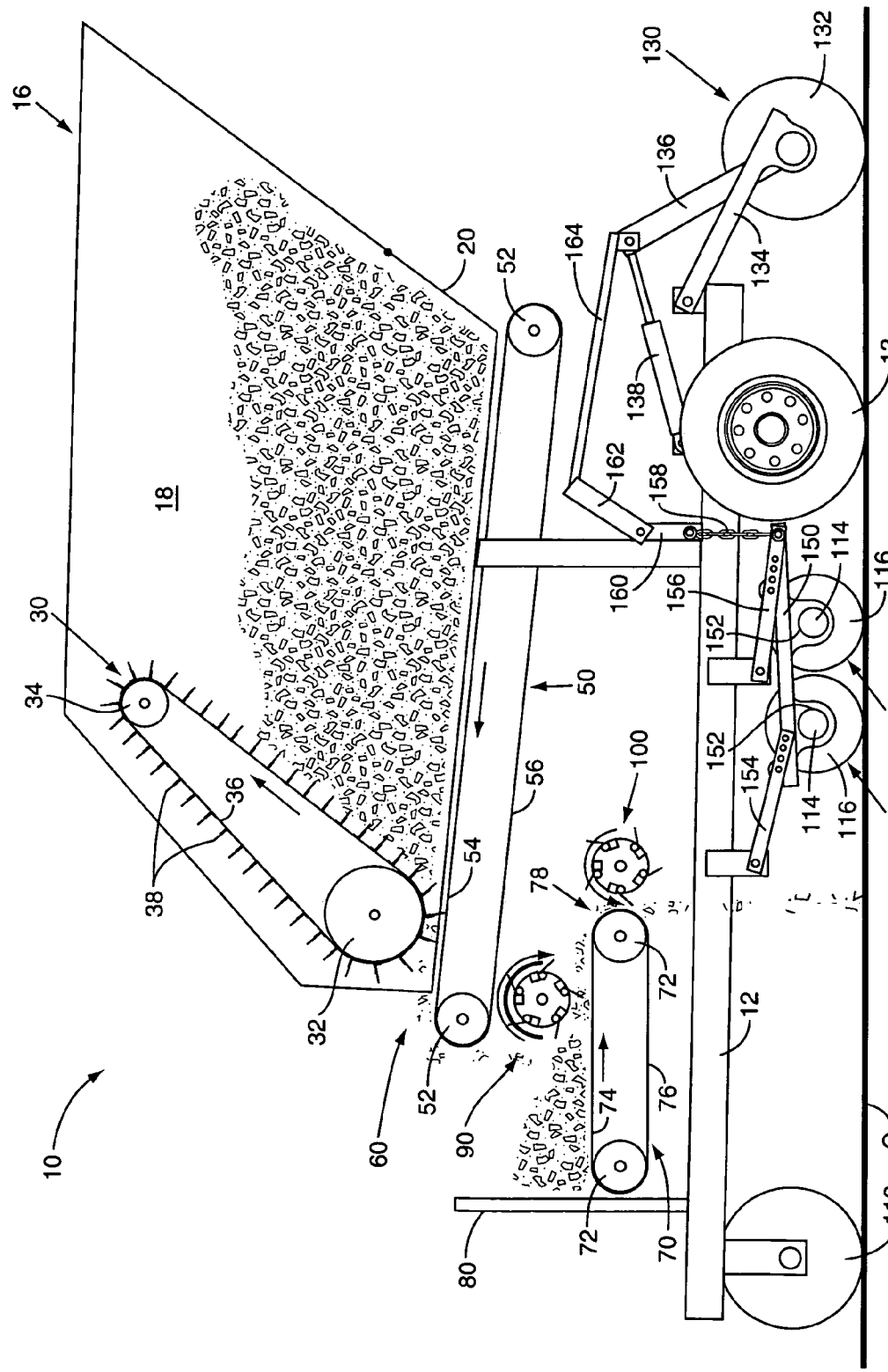
FIG. 2 is a side elevational view, in schematic form, showing the sprig planting machine in a broadcast planting mode.

Turning to FIG. 2, mounted in the front portion of the hopper 16 and extending transversely across the hopper is a hopper agitator indicated generally by the numeral 30. Hopper agitator 30 can be driven in any number of conventional ways, but it is contemplated that an efficient means of driving the hopper agitator would be hydraulically. That is, hopper agitator 30 may be driven through the hydraulic control system associated with a tractor attached to the sprig planting machine 10 or, in the alternative, the machine itself may be provided with its own hydraulic power system. In any event, the hopper agitator 30 includes a pair of lower sprockets 32 secured to a transversely extending shaft and a pair of upper sprockets 34 secured to another transversally extending shaft. Trained around the sprockets 32 and 34 is a pair of chains 36. Spaced along the chains and connected to the chains is a series of bars (not shown). Tines 38 are secured to the bars and extend outwardly therefrom. As illustrated in the drawings, the hopper agitator 30 is designed to be driven generally counterclockwise. As viewed in FIG. 2, for example, the lower run of the chains 36 moves upwardly from the lower sprockets 32 to the upper sprockets 34, while the upper run generally moves downwardly from the upper sprocket 34 to the lower sprockets 32. As will be understood more fully from subsequent portions of this disclosure, a conveyor underlying hopper 16 effectively conveys the sprig material toward the front of the hopper and into the moving hopper agitator 30. Tines 38 associated with the hopper agitator 30 engage the oncoming sprig material and agitate, fluff and generally separate the individual sprigs.

Disposed below hopper 16 is a first conveyor indicated generally by the numeral 50. Conveyor 50, like hopper agitator 30, is preferably hydraulically driven. Conveyor 50 includes a conveying surface such as a chain or open mesh type apron, which is trained around a pair of roller or sprocket sets 52. As illustrated in the drawings, conveyor 50 is disposed at an incline with respect to the main frame 12. That is, conveyor 50 includes an upper end portion and a lower end portion. In the case of the embodiment illustrated herein, the lower end portion of the conveyor is disposed about the rear portion of the sprig planting machine 10 while the upper end portion of the conveyor 50 is disposed about a front portion of the sprig planting machine 10. Further, the conveyor 50 includes an upper run 54 and a lower run 56. Sprig material contained within the hopper 16 is conveyed from the lower end portion of the conveyor 50 to the upper end portion of the conveyor. In the process of conveying the sprig material, sprigs are conveyed underneath the hopper agitator 30 and discharged from a discharge end, indicated generally by the numeral 60, of the conveyor. In the case of the present embodiment, the upper end portion of the conveyor 50 acts as the discharge end 60.

Figure 4:
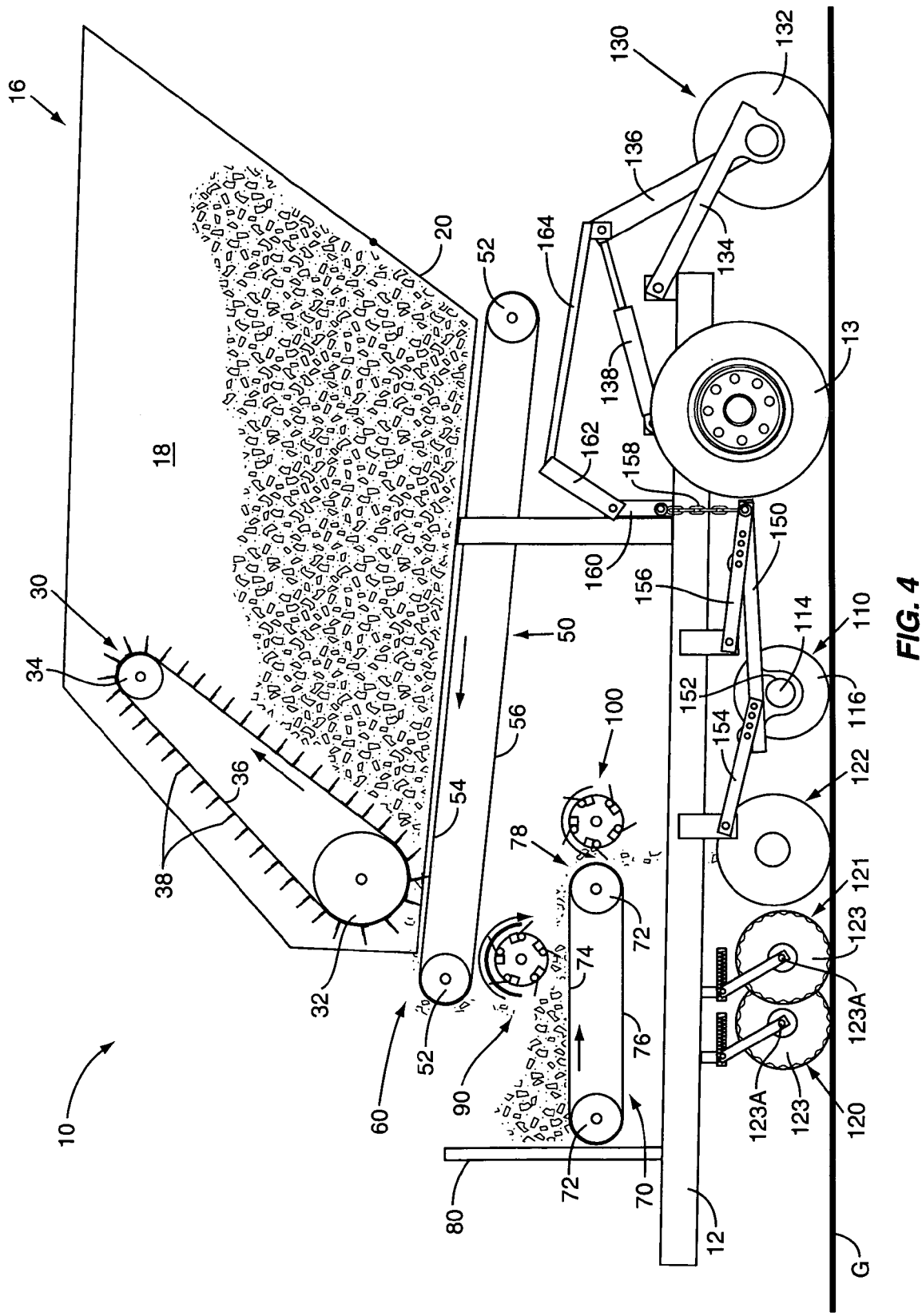
FIG. 4 is a schematic side elevational view similar to FIG. 2 except that the sprig planting machine is illustrated in a row planting mode.

Underlying a portion of the first conveyor 50 is a second conveyor, indicated generally by the numeral 70. Second conveyor 70, like the first conveyor 50, is preferably hydraulically driven. Forming a part of the second conveyor 70 is a pair of rollers or sprocket sets 72 that receive and support an upper run 74 and a lower run 76. Second conveyor 70, like the first conveyor 50, could include various types of material for the conveyor apron, but in the case of this embodiment it is contemplated that the apron would constitute a flexible and pliable open mesh type conveying surface. As illustrated in FIGS. 2 and 4, during planting, upper run 54 of the first conveyor 50 is designed to convey sprigs right to left. Upper run 74 of the second conveyor 70 is designed to convey sprigs left to right, or generally in a direction opposite to the direction of movement of the sprigs on conveyor 50.

Second conveyor 70, as illustrated in the drawings, is disposed below the first conveyor 50. Second conveyor 70 underlies the upper end portion or the discharge end 60 of the first conveyor 50. Sprigs discharged by the discharge end 60 of the conveyor 50 fall downwardly onto an intermediate area of the upper run 74 of the second conveyor 70. From there the sprigs are conveyed left to right as viewed in the drawings to where they are discharged from a discharge end, indicated generally by the numeral 78.

Secured to the sprig planting machine adjacent the end of the second conveyor 70 opposite the discharge end 78 is a retaining wall 80. Retaining wall 80 tends to confine sprig material on the upper run 74 of the second conveyor 70. Additionally, disposed above upper run 74, intermediately between the opposed end portions of the second conveyor 70, is a rotary agitator indicated generally by the numeral 90. Rotary agitator 90 is also hydraulically driven or driven by other suitable means. As viewed in FIGS. 2 and 4, rotary agitator 90 is driven clockwise such that it turns generally counter to the direction of movement of the upper run 74 of conveyor 70. That is, the lower portions of the rotary agitator 90 are generally moving counter to the direction of movement of the upper run 74 and generally counter to the movement of sprig material being conveyed on the upper run 74.

Details of the rotary agitator 90 are not shown in detail. However, as seen in the drawings, the rotary agitator 90 would extend transversely across conveyor 70 and would preferably be spaced above the upper run 74 thereof such that sprig material could pass between the rotary agitator 90 and the upper run 74. However, in terms of the construction of rotary agitator 90, the same would include a central shaft and a pair of end plates. Connected between the end plates would be a series of circumferentially spaced bars, with each bar having a plurality of tines extending outwardly therefrom. The central shaft would be rotatatively mounted within a frame structure. Thus, it is appreciated that as the rotary agitator 90 is driven, the individual tines extending transversally across the rotary agitator 90 would move clockwise and engage the oncoming sprig material and tend to agitate, fluff and separate the sprig material. In fact, because of the counter rotation of the rotary agitator 90, it is appreciated that the rotary agitator would inhibit the free flow of sprig material on conveyor 70 and off the discharge end 78 thereof. In fact, the sprig material on conveyor 70 would, in some cases, tend to accumulate between rotary agitator 90 and retaining wall 80. However, because of the spacing of the rotary agitator 90 with respect to the upper run 74 of conveyor 70, it follows that a continuous flow of sprig material would pass underneath the rotary agitator and be discharged off the discharge end of 78.

Disposed adjacent the discharge end 78 of the second conveyor 70 is a directional rotary assembly, indicated generally by the numeral 100. Like many of the other moving components of the sprig planting machine 10, it is contemplated that the directional rotary assembly 100 would be hydraulically driven. Rotary assembly 100 is termed a directional rotary assembly because it assists in directing the sprig material discharged by the second conveyor 70 downwardly onto the under passing ground G. Directional rotary assembly 100 is, from a structural point of view, similar to the rotary agitator 90, described above. However, in the case of the directional rotary assembly 100, the same is driven counterclockwise (as viewed, for example, in FIGS. 2 and 4), a direction that is opposite of that of the rotary agitator 90. As seen in FIGS. 2 and 4, a transverse opening is defined between the discharge end 78 of second conveyor 70 and the directional rotary assembly 100. As sprig material is discharged from the discharge end 78 of the second conveyor 70, the sprig material is engaged by the counter rotating directional rotary assembly 100. This engagement by the tines of the rotary assembly 100 tends to propel or urge the sprig material straight downwardly off the discharged end 78 of the second conveyor 70 to the underlying ground. Details of the rotary assembly 100 are not dealt with here but it should be appreciated that the rotary assembly would include a central shaft, a pair of end plates, a series of bars extending transversely between the end plates, with each bar including a plurality of spaced apart tines.

Figure 3:
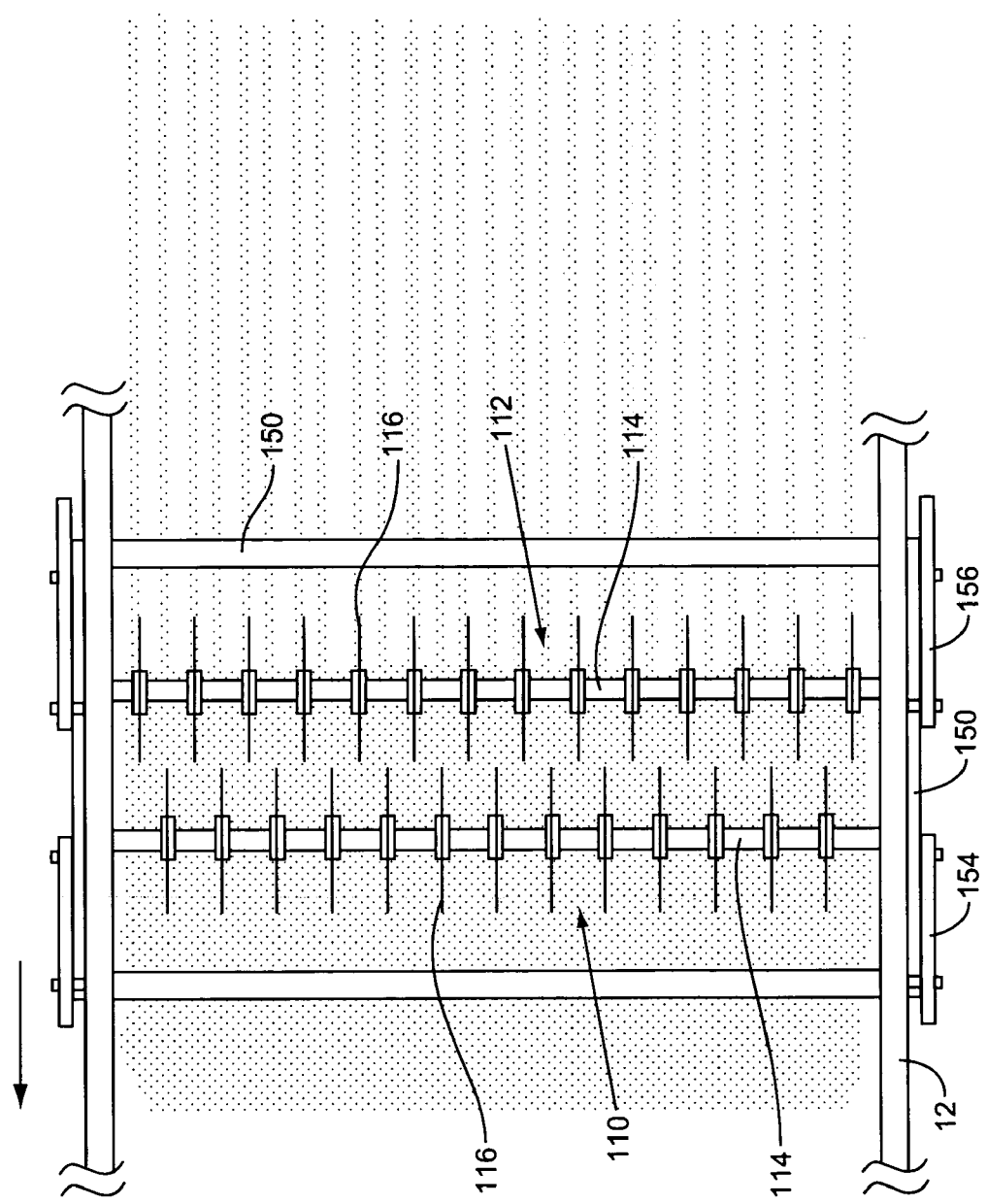
FIG. 3 is a schematic plan view of a portion of the sprig planting machine illustrating sprigs being planted in a broadcasted configuration.

Therefore, as the sprig planting machine 10 is moved over the ground G, it follows that a swath of sprigs are discharged between the discharge end 78 of conveyor 70 and the rotary assembly 100. Sprig planting machine 10 of the present invention is designed to either broadcast the sprigs or to plant the sprigs in rows. Accordingly, the sprig planting machine 10 is designed to have two planting options, a broadcast planting option as shown in FIGS. 2 and 3 or a row planting option illustrated in FIGS. 4 and 5.

First, with respect to the broadcast planting option, sprig planting machine 10 is provided with two sets of gang discs, sets 110 and 112. Each gang disc includes a central shaft 114 rotatively mounted at opposite ends within bearing assemblies and a series of laterally spaced discs 116 fixed to the shaft. The object is to plant the individual sprigs or groups of sprigs in a broadcasted configuration. Thus, the sets of gang discs 110 and 112 are spaced rearwardly from where the sprig material is discharged from conveyor 70. Therefore, the sprig material being discharged between the conveyor 70 and the directional rotary assembly 100 falls onto the ground in a fairly uniform manner. The discs 116 engage the sprig material while on the ground G and press the sprig material into the ground G to plant the same. The spacing, in one design, between the respective discs 116 can be approximately 2 and ⅜ inches, or in some cases with additional discs, can be as small as 1 and 3/16 inches. Also, in the broadcast planting mode, the sprig planting machine 10 may be provided with a front roller 118 (FIG. 2). Front roller 118 is optional but could be used to prepare the ground G prior to the sprig material being dispersed thereon for planting.

Figure 5:
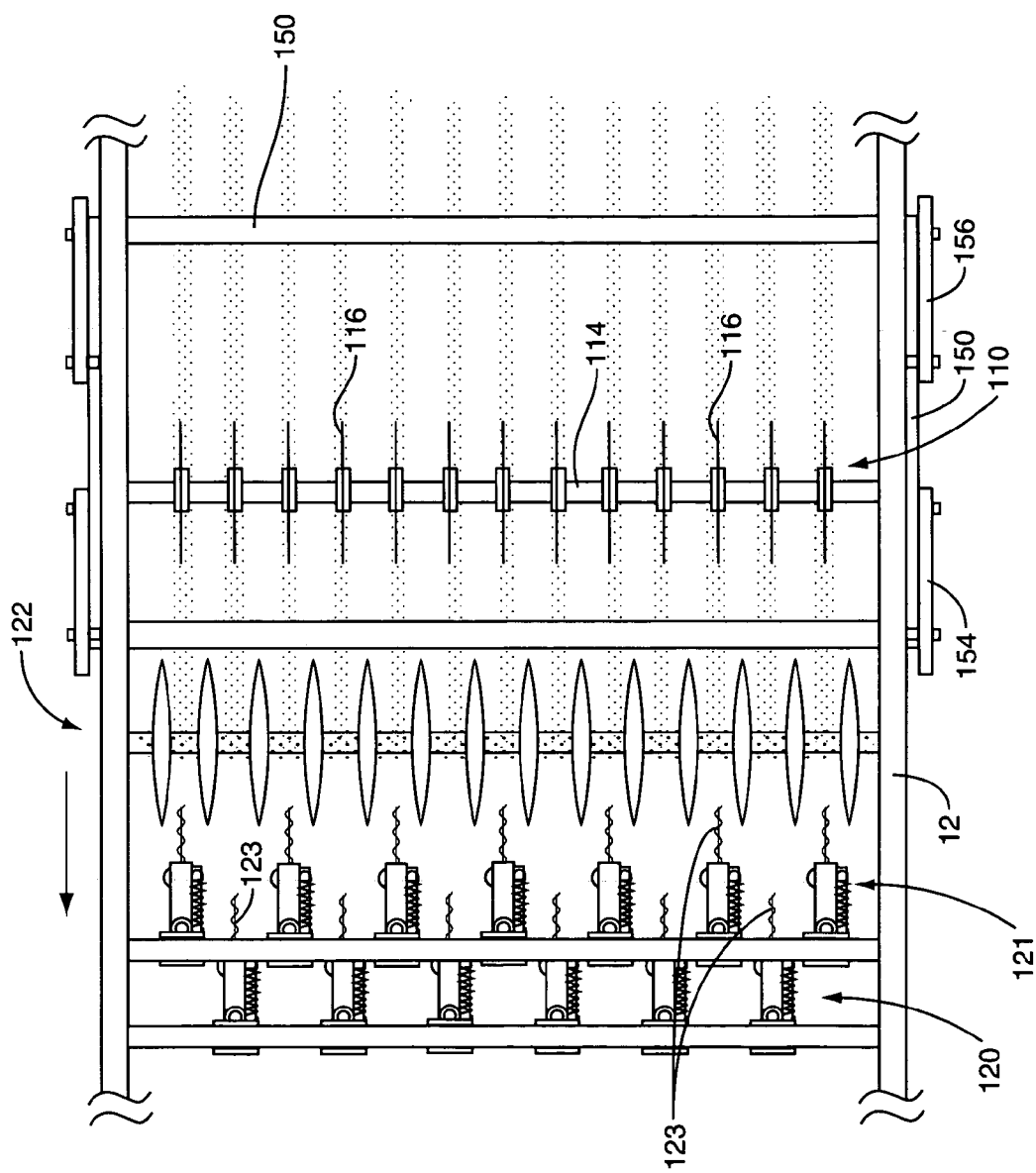
FIG. 5 is a schematic plan view showing a portion of the sprig planting machine planting sprigs in a row configuration.

Now turning to FIGS. 4 and 5, the row planting option is shown therein. Row planting option is provided with a series of discs that are designed to perform three separate functions. First, there is a need to precut slits in ground G. Secondly, it is desirable to control the flow of sprig material onto the ground G such that the sprig material is dispersed onto the ground in a row configuration. Thirdly, it is desirable to engage the sprig material after it has been dispersed into a row configuration and to press the sprig material into the ground, preferably in the precut slit that preceded the controlled dispersion of the sprig material.

In order to achieve these three functions, the row planting option for the sprig planting machine 10 of the present invention is provided with first and second sets of cutting discs 120 and 121. One set of discs may be sufficient. In any event, as illustrated in FIG. 4, the first and second sets of cutting discs 120 and 121 are disposed just forwardly of where the sprig material is discharged from the conveyor 70. In any event, each set of cutting discs 120 and 121 will include a series of discs 123 rotatively mounted on a shaft 123A. Details of the structure and mounting of these discs are not dealt with here in detail because such discs are well known in the agricultural arts.

Disposed behind the first and second sets of cutting discs 120 and 121 is a structure that is designed to disperse the sprig materials in a row configuration. Here the present invention utilizes a series of funneling discs, indicated generally by the numeral 122. Each funneling disc comprises a pair of concave discs secured together in face-to-face relationship such that the outer sides of each disc assume a generally convex shape. Thus, when the funneling discs 122 are disposed in side-by-side relationship along a common shaft and positioned underneath the flow of sprig material falling from the discharge end 78 of conveyor 70, it follows that the funneling disc tends to direct the sprig material into a series of spaced apart rows (FIG. 5).

Disposed behind or trailing discs 122 is a gang of planting or pressing discs 110. Generally, for each row of sprig material dispersed on the ground G, there would be one pressing or planting disc 116 aligned with that row of sprig material to engage the sprig material in the row and to press the sprig material into a slit cut by the preceding cutting discs 120 and 121. In the case of the present embodiment, the pressing or planting gang of discs 110 comprise a main shaft 114 having a series of laterally spaced discs 116 secured thereto. Thus, as illustrated in FIG. 5, when the sprig planting machine 10 is adapted for the row planting option, the sprig material is pressed or planted into the ground as indicated by the rows of dots extending left to right from the funneling disc 122 show in FIG. 5.

Sprig planting machine 10 further includes a trailing packer generally indicated by numeral 130. Packer 130 extends transversely across the rear of the main frame 12 and includes a cylindrical conditioning roller 132. To connect the conditioning roller 132 to the sprig planting machine 10, there is provided on each side of the main frame 12 a connecting arm 134. Connecting arm 134 is pivotally connected to the main frame 12 and is further connected to a bearing assembly that in turn receives and holds a central shaft or stub shaft associated with the cylindrical roller 132. Usually the operator will utilize the cylindrical roller 132 to roll and gently pack the planted sprig material in both the row planting and broadcasting mode. There are occasions when it is desirable for the packer 130 to assume an elevated position where the cylindrical roller 132 does not engage the underlying ground G. In order to accommodate this there is provided a pair of lift arms 136, each lift arm 136 connected to a connecting arm 134 and extending therefrom to where the same connects to the rod end of a hydraulic cylinder 138 that is in turn pivotally mounted to the main frame 12 of the sprig planting machine. As will be appreciated by those skilled in the art, the hydraulic cylinders 138 can be controlled by an operator stationed on the tractor coupled to the sprig planting machine 10.

It is also desirable to lift the components that make up the broadcast or row planting options when the sprig planting machine makes a substantial turn. That is, for example, when the sprig planting machine 10 is required to make a 90 degree or 180 degree turn, it is desirable to lift the various discs that comprise either the broadcast option or the row planting option prior to making the turn. This is primarily accomplished by the provision of a main elevating cylinder 170 mounted between the main frame 12 and the tongue 14 (See FIGS. 1 and 1A).

Figure 1A:
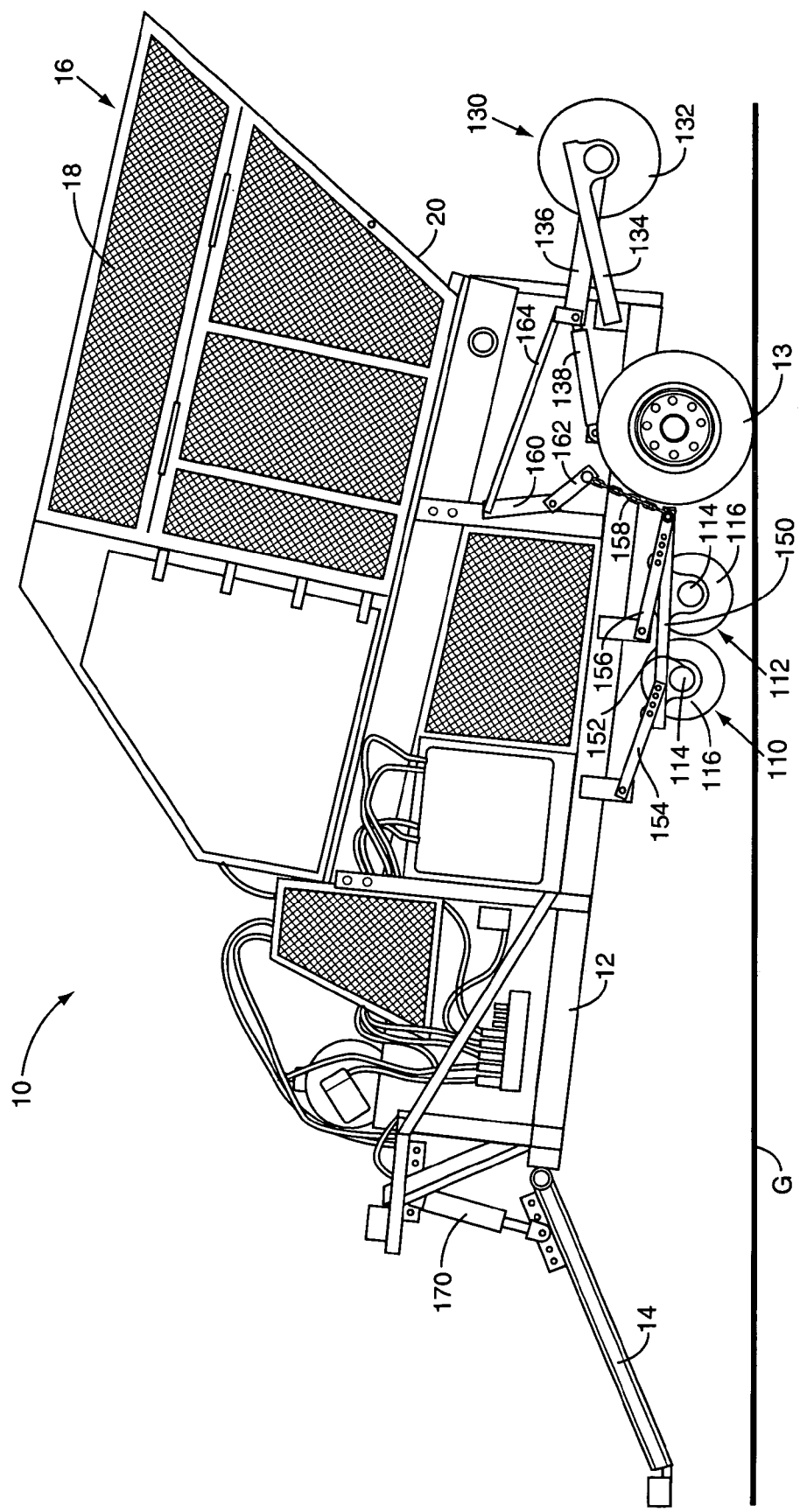
FIG. 1A is a side elevational view of the sprig planting machine illustrating how the front portion of the main frame may be elevated and further illustrating the elevation of the planting discs.

When hydraulic cylinder 170 is in the retracted position, as shown in FIG. 1, it is seen that the main frame 12 assumes a generally horizontal posture. When the elevating cylinder 170 is actuated and extended, the angle of the tongue 14 changes with respect to the main frame 12. Since the terminal end of tongue 14 is secured to a draw bar of a tractor and the tongue is pivotally connected to the main frame, this means that the front portion of the main frame 12 is elevated as shown in FIG. 1A. When the sprig planting machine assumes the row planting configuration shown in FIGS. 2 and 4, it follows that the cutting disc 120 and 121, along with the funneling disc 122 and the planting or pressing discs 110 and 112, will be elevated off the ground G.

The inclination of the main frame 12 shown in FIG. 1A is sufficient to lift the planting discs 110 and 112 (See FIG. 1A). In some cases, it may be desirable to provide additional lift for the planting discs 110 and 112 when the sprig planting machine 10 assumes the broadcast mode or to provide additional lift for the planting discs 110 and 112 when the machine 10 assumes the row planting mode. To achieve this, the hydraulic cylinders 138 used to elevate the packer 130 are utilized. More specifically, with reference to the broadcast option shown in FIGS. 1–2, the two sets of disc 110 and 112 are supported within a planting disc frame 150. Planting disc frame 150 includes a rectangular frame that extends around the discs 116 and supports the shafts 114 through a series of bearings 152. On each side of the sprig planting machine 10, there is provided a pair of lift links 154 and 156. Each lift link is pivotally mounted at one end to the main frame 12 of the sprig planting machine. The other end of lift links 154 and 156 are pivotally connected to the planting disc frame 150. Connected on each side of the machine 10 is a chain or link 158. The chain or link 158 is connected to a rear portion of the planting disc frame 150 or to the rear left link 156 and extends upwardly therefrom to where it connects to a pivotally mounted bell crank, the bell crank including two arms, 160 and 162. Chain or link 158 is connected to the end of arm 160. The other arm, arm 162, of the bell crank is connected to a connecting link 164 that extends rearwardly and connects to the rod end of the hydraulic cylinder 138. Therefore, as illustrated in FIGS. 1 and 1A, when the cylinders 138 are retracted, the packer 130 disposed about the rear of the machine 10 is elevated as shown in dotted lines in FIG. 1 and in full lines in FIG. 1A. Further, the retraction of the hydraulic cylinders 138 on each side of the machine 10 causes the connecting link 164 to be driven forwardly. This in turn rotates the bell crank and its arms 160 and 162 counterclockwise as viewed in FIG. 1. This counterclockwise movement of the bell crank results in the chain or link 158 lifting the rear portion of the planting disc frame 150. As the planting disc frame 150 is lifted, the lift links 154 and 156 tend to stabilize and guide the planting disc frame 150 upwardly to a suspended position shown in FIG. 1A. Although not shown, there is provided a series of coil springs interposed between the planting disc frame 150 and the main frame 12 of the sprig planting machine 10. These springs tend to bias the planting disc frame 150 and the disc 116 carried thereby downwardly into engagement with the ground. Thus, it is appreciated that when the entire planting disc frame 150 is lifted as illustrated in FIG. 1A, that the bias of these springs is overcome by the lifting force of the hydraulic cylinders 138.

Figure 6:
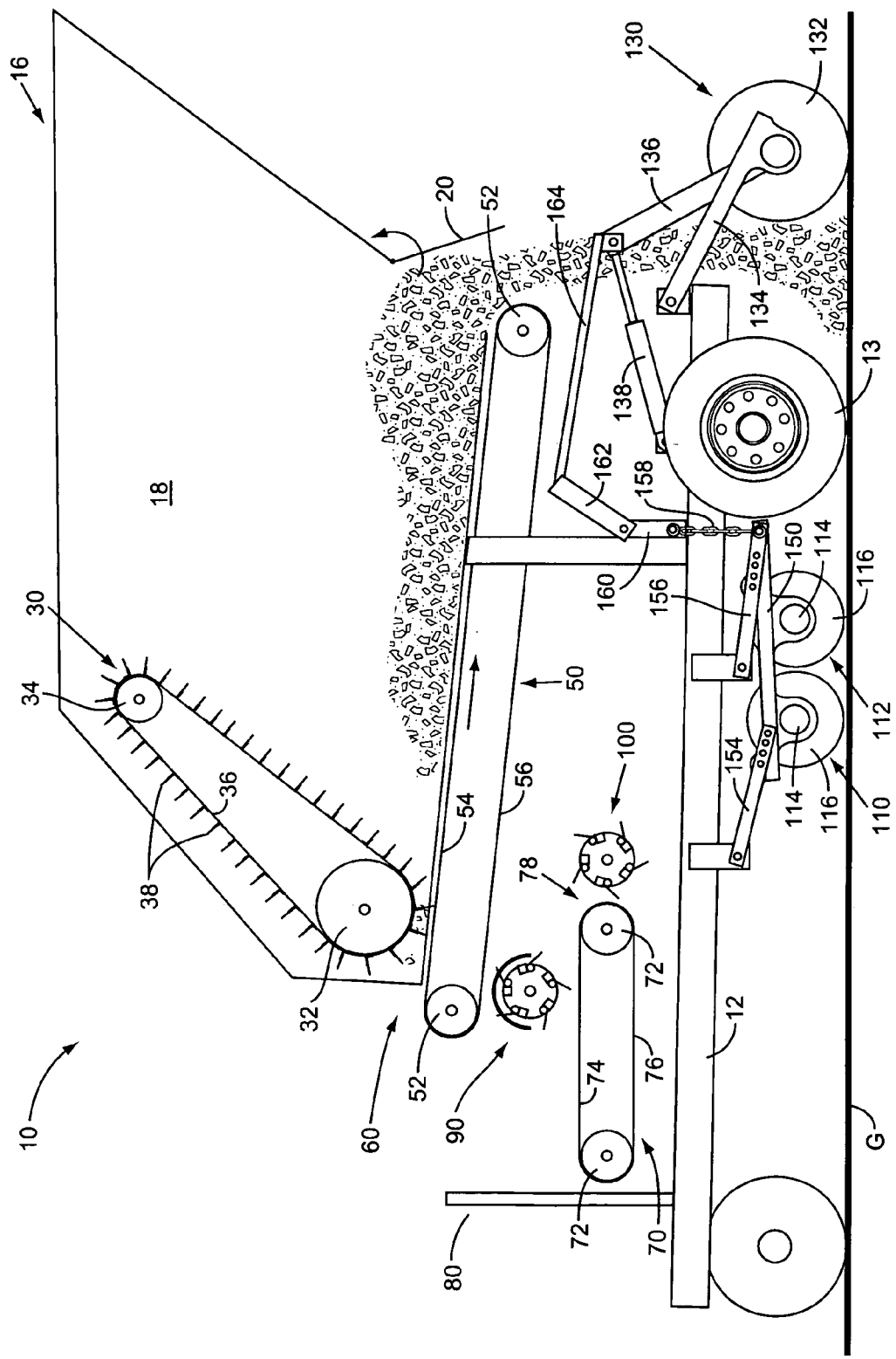
FIG. 6 is another schematic side elevational view of the sprig planting machine illustrating the openable tail gate and the use of a conveyor to unload sprigs from the hopper of the sprig planting machine.

As alluded to before, there may be occasions when the hopper 16 includes sprig material and it is desirable to unload the same. In order to accommodate this, the hopper is provided with the tailgate 20. Further, the first conveyor 50 is reversible such that, as illustrated in FIG. 6, the upper run 54 can be moved left to right. When so moved and the tailgate 20 is in an open position, sprig material held within hopper 16 is conveyed out the open tailgate 20 by the reverse action of conveyor 50.

One of the principal advantages of the sprig planting machine 10 of the present invention is that the machine provides a generally uniform and consistent distribution of sprigs as the machine traverses a planting area. As noted above, many of the driven components of the sprig planting machine 10 are hydraulically driven. It is appreciated that these components can be driven by variable speed hydraulic motors that can be periodically adjusted or even adjusted during the course of a planting operation. However, in one approach to achieving a uniform planting of sprigs, the speeds of the conveyors 50 and 70, along with the speed of the rotary agitator 90, and directional rotary assembly 100 are set at a selected speed. Then the operator elects a ground speed that will distribute a certain volume or quantity of sprigs per acre. For example, it may be desired to distribute 500 bushels of sprigs per acre. In this case, it may be determined that by traveling at a ground speed of 5 mph that the sprig planting machine, under normal conditions, would distribute approximately 500 bushels of sprigs per acre. This is simply one approach to obtaining a generally uniform distribution or planting of sprigs. Aside from varying or adjusting the speeds of the various driven components, the present invention is able to uniformly distribute or plant sprigs because of the material handling system employed in the sprig planting machine itself. That is, the use of at least two conveyors 50 and 70 along with the rotary agitator 90 cooperates together to engage, agitate, fluff and separate the sprig material. By treating the sprig material in such a manner, one is better able to monitor and control the distribution of the sprig material.

As noted above, the driven components of the sprig planting machine, in a preferred embodiment, are hydraulically driven. The hydraulic system utilized to drive these components may assume various configurations. In one configuration, the hydraulic drive system is mounted on the sprig planting machine itself and is driven by the power take off of the tractor that pulls the machine. Typically, such hydraulic control systems would include various control valves for controlling the flow of fluid to various hydraulic motors that, in turn, drive such components as the conveyors 50 and 70, the hopper agitator 30 and the various rotary devices 90 and 100. These control valves can be individually adjusted to drive the various components at certain speeds or at a certain rpm. In cases where the hydraulic control system is principally mounted on the machine, there would also be provided an associated electric control unit or system that would provide for "on" and "off" capability from the tractor. Essentially, these integrated systems are sometimes referred to as an electric over hydraulic control system. In any event, the speeds of the individual components of the machine can be separately controlled and their on/off state can be controlled electrically directly from the tractor. It will be appreciated by those skilled in the art, that other drive systems and other types of hydraulic control systems can be employed.

The present invention may, of course, be carried out in other specific ways than those herein set forth without departing from the spirit and essential characteristics of the invention. The present embodiments are, therefore, to be considered in all respects as illustrative and not restrictive, and all changes coming within the meaning and equivalency range of the appended claims are intended to be embraced therein.

What is claimed is:

1. A sprig planting machine, comprising:
   a) a frame structure;
   b) a sprig holding area;
   c) a first moving conveyor for receiving sprigs and conveying the sprigs in a first general longitudinal direction to a discharge point;
   d) a second moving conveyor disposed on the sprig planting machine for receiving sprigs after the sprigs have been conveyed on the first conveyor and for conveying the sprigs in a second general longitudinal direction generally opposite to the direction the sprigs are conveyed on the first conveyor;
   e) wherein the second conveyor includes opposed ends and wherein the first conveyor includes a discharge end that is disposed over the second conveyor and between the opposed ends of the second conveyor;
   f) wherein the first conveyor is disposed at an incline on the sprig planting machine with the discharge end being elevated with respect to an opposite end of the first conveyor; and
   g) wherein the second conveyor discharges the sprigs.

2. The sprig planting machine of claim 1 including a rotary agitator disposed adjacent the second conveyor and rotatable counter to the movement of sprigs on the second conveyor such that as the sprigs are conveyed on the second conveyor the rotary agitator engages the oncoming sprigs and agitates them.

3. The sprig planting machine of claim 2 wherein the second conveyor includes a discharge end and a retainer disposed adjacent an opposite end of the second conveyor, and wherein the retainer tends to retain sprigs on the second conveyor that tend to accumulate due to the action of the rotary agitator.

4. The sprig planting machine of claim 1 including a rotary member disposed adjacent the discharge end of the second conveyor for engaging sprigs being discharged by the second conveyor and directing the sprigs downwardly.

5. The sprig planting machine of claim 1 including two planting options, a first planting option for broadcasting the sprigs and a second planting option for planting the sprigs in rows.

6. The sprig planting machine of claim 5 wherein the frame structure is adapted to support the first planting option or the second planting option.

7. The sprig planting machine of claim 5 wherein said planting option for broadcasting the sprigs includes a series of spaced apart discs mounted to the frame structure.

8. The sprig planting machine of claim 5 wherein second planting option for planting the sprigs in rows includes a first set of spaced apart cutting discs for cutting slits in the ground, a second set of directing discs for engaging at least some of the sprigs being discharged and directing the sprigs into rows on the underlying ground, and a third set of planting discs for engaging the sprigs and pressing the sprigs into the ground.

9. The sprig planting machine of claim 8 wherein the first set of cutting discs precedes the second set of directing discs which in turn precedes the third set of planting discs.

10. The sprig planting machine of claim 1 wherein the first conveyor is disposed at an incline and includes an elevated discharge end that overlies the second conveyor; and wherein there is provided a rotary agitator disposed above the second conveyor for agitating and fluffing the sprigs being conveyed on the second conveyor; and wherein the rotary agitator rotates generally counter to the direction of movement of the sprigs on the second conveyor such that the rotary agitator tends to inhibit the movement of at least a portion of the sprigs as the second conveyor conveys the sprigs past the rotary agitator.

11. The sprig planting machine of claim 10 wherein the second conveyor includes a discharge end and a retainer disposed adjacent the end of the second conveyor opposite the discharge end, and wherein the rotation of the rotary agitator causes sprigs to accumulate on the second conveyor between the retainer and the rotary agitator.

12. The sprig planting machine of claim 10 wherein the sprigs are held within a hopper disposed over the first conveyor.

13. The sprig planting machine of claim 1 wherein the sprig holding area includes at least a partially open bottom, a surrounding retaining wall, and an unloading gate; and wherein the first conveyor is disposed underneath the bottom of the sprig holding area and is reversible for conveying sprigs out the unloading gate.

14. The sprig planting machine of claim 13 wherein the first conveyor is disposed at an incline and includes an upper end portion and a lower end portion, and wherein the unloading gate is disposed above and adjacent the lower end portion of the first conveyor.

15. The sprig planting machine of claim 14 including a second conveyor disposed below the upper end portion of the first conveyor and positioned to receive sprigs discharged from the upper end portion of the first conveyor; and wherein the second conveyor is adapted to convey sprigs toward the lower end portion of the first conveyor.

16. The sprig planting machine of claim 15 including a rotary agitator disposed above the second conveyor for engaging and agitating sprigs being conveyed on the second conveyor.

17. A method of planting grass sprigs, comprising:
   a) placing a supply of grass sprigs in a receiving area on a sprig planting machine;
   b) moving the sprig planting machine over the ground;
   c) transferring the grass sprigs from the receiving area to a first moving conveyor;
   d) conveying the grass sprigs on the first conveyor to a discharge point and discharging the grass sprigs onto a second conveyor;
   e) conveying the grass sprigs on the second conveyor and discharging the grass sprigs from the second conveyor;
   f) engaging the grass springs with a rotary agitator positioned over the second conveyor as the grass sprigs are conveyed on the second conveyor, and rotating the rotary agitator in a direction counter to the direction of movement of the grass sprigs on the second conveyor such that the grass sprigs are conveyed into the rotary agitator and agitated and fluffed by the counter rotation of the rotary agitator; and
   g) directing the grass sprigs onto the underlying ground as the sprig planting machine moves over the ground.

18. The method of claim 17 wherein the rotary agitator is disposed between the first and second conveyors and intermediately between opposed ends of the second conveyor.

19. The method of claim 17 including reversing the direction of movement of the grass sprigs by discharging the grass sprigs directly from the first conveyor onto the second conveyor as the direction of movement of the grass sprigs on the second conveyor is generally opposite the direction of movement of the grass sprigs on the first conveyor.

20. The method of claim 17 including conveying the grass sprigs on the first conveyor in a first direction and conveying the grass sprigs on the second conveyor in a second direction that is generally opposite to the direction of the first conveyor.

21. The method of claim 17 including conveying the grass sprigs on the first conveyor to a point where the grass sprigs are discharged to an underlying second conveyor and then conveying the grass sprigs on the second conveyor in a direction generally opposite to the direction of the grass sprigs on the first conveyor, and conveying the grass sprigs on the second conveyor to a discharge point lying underneath the first conveyor and discharging the grass sprigs from the second conveyor.

22. The method of claim 21 wherein the grass sprigs are conveyed on the first conveyor toward the front portion of the sprig planting machine, and are conveyed on the second conveyor toward the rear portion of the sprig planting machine.

23. A sprig planting machine having a main frame; a hopper for receiving and holding sprigs and having at least a partially open bottom and a surrounding wall structure; a first conveyor disposed underneath the hopper and moveable in two directions, a second conveyor; wherein in a planting mode the sprigs are conveyed in one direction on the first conveyor and in an opposite direction on the second conveyor; and the hopper including an openable gate that enables sprigs within the hopper to be unloaded by moving the first conveyor in a direction toward the openable gate such that the sprigs contained in the hopper are conveyed from the hopper through the gate.

24. The sprig planting machine of claim 23 where the first conveyor is disposed at an incline and includes an upper end portion and a lower end portion; and wherein the openable gate of the hopper is disposed above and adjacent the lower end portion of the first conveyor.

25. The sprig planting machine of claim 23 including a rotary agitator disposed above the second conveyor for engaging and agitating sprigs being conveyed on the second conveyor.

26. The sprig planting machine of claim 23 including two planting options, a broadcast planting option and a row planting option; and wherein the sprig planting machine is adapted to receive and support either option.

27. A sprig planting machine, comprising:
   a) a frame structure;
   b) a sprig holding area;
   c) a first conveyor for receiving sprigs and conveying the sprigs to a discharge point;
   d) a second conveyor disposed on the sprig planting machine for receiving sprigs after the sprigs have been conveyed on the first conveyor and for conveying the sprigs in a direction generally opposite to the direction the sprigs are conveyed on the first conveyor and wherein the second conveyor discharges the sprigs; and
   e) two planting options, a first planting option for broadcasting the sprigs and a second planting option for planting the sprigs in rows.

28. A sprig planting machine having a main frame; a hopper for receiving and holding sprigs and having at least a partially open bottom and a surrounding wall structure; a first conveyor disposed underneath the hopper and moveable in two directions; the hopper including an openable gate that enables sprigs within the hopper to be unloaded by moving the first conveyor in a direction toward the openable gate such that the sprigs contained in the hopper are conveyed from the hopper through the gate; and wherein the sprig planting machine further includes two planting options, a broadcast planting option and a row planting option; and wherein the sprig planting machine is adapted to receive and support either option.

* * * * *